United States Patent
Chung et al.

(10) Patent No.: US 9,724,674 B2
(45) Date of Patent: Aug. 8, 2017

(54) CATALYST HAVING SURFACE-MODIFIED METAL NANOPARTICLES IMMOBILIZED IN STATIONARY PHASE IN WHICH A POLYMER ELECTROLYTE MEMBRANE IS FORMED, AND PREPARATION METHOD THEREOF

(75) Inventors: Young Min Chung, Daejeon (KR); Yong Tak Kwon, Daejeon (KR); Tae Jin Kim, Daejeon (KR); Seung Hoon Oh, Seoul (KR); Chang Soo Lee, Daejeon (KR); Bo Yeol Kim, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 328 days.

(21) Appl. No.: 13/637,547

(22) PCT Filed: Mar. 25, 2011

(86) PCT No.: PCT/KR2011/002055
§ 371 (c)(1),
(2), (4) Date: Sep. 26, 2012

(87) PCT Pub. No.: WO2011/122791
PCT Pub. Date: Oct. 6, 2011

(65) Prior Publication Data
US 2013/0022535 A1    Jan. 24, 2013

(30) Foreign Application Priority Data
Mar. 29, 2010   (KR) .................. 10-2010-0027651

(51) Int. Cl.
B01J 31/26 (2006.01)
B01J 23/40 (2006.01)
(Continued)

(52) U.S. Cl.
CPC .............. B01J 23/40 (2013.01); B01J 23/44 (2013.01); B01J 23/70 (2013.01); B01J 31/08 (2013.01);
(Continued)

(58) Field of Classification Search
None
See application file for complete search history.

(56) References Cited

U.S. PATENT DOCUMENTS 5,180,573 A   1/1993 Hiramatsu et al.
6,375,920 B2  4/2002 Fischer et al.
(Continued)

FOREIGN PATENT DOCUMENTS

EP        2431093 A2    3/2012
KR   10-1997-0007425 B1  5/1997
(Continued)

OTHER PUBLICATIONS

Jose M. Campos-Martin, et al., "Hydrogen Peroxide Synthesis: An Outlook beyond the Anthraquinone Process," Angew. CHem. Int. Ed., vol. 45, pp. 6962-6984 (2006).
(Continued)

*Primary Examiner* — Melissa Swain
(74) *Attorney, Agent, or Firm* — Abelman, Frayne & Schwab (57) ABSTRACT

The present invention relates to a catalyst having surface-modified metal nanoparticles immobilized in a stationary phase in which a polymer electrolyte membrane is formed, and a preparation method thereof. The catalyst of the present invention may be used in a process for producing hydrogen peroxide by direct synthesis from oxygen and hydrogen.

7 Claims, 4 Drawing Sheets

(51) Int. Cl.

| | |
|---|---|
| *B01J 23/44* | (2006.01) |
| *B01J 23/70* | (2006.01) |
| *B01J 31/08* | (2006.01) |
| *B01J 31/10* | (2006.01) |
| *B01J 35/00* | (2006.01) |
| *B01J 37/02* | (2006.01) |
| *C01B 15/029* | (2006.01) |

(52) U.S. Cl.
CPC .............. *B01J 31/10* (2013.01); *B01J 35/006* (2013.01); *B01J 35/0013* (2013.01); *B01J 37/0207* (2013.01); *C01B 15/029* (2013.01); *B01J 2531/824* (2013.01)

(56) References Cited

U.S. PATENT DOCUMENTS

| | | | |
|---|---|---|---|
| 7,229,942 | B2 | 6/2007 | Suh et al. |
| 7,691,773 | B2 | 4/2010 | Suh et al. |
| 2005/0201925 | A1 | 9/2005 | Le-Khac et al. |
| 2007/0231248 | A1 | 10/2007 | Rueter et al. |
| 2008/0081017 | A1 | 4/2008 | Zhou et al. |

FOREIGN PATENT DOCUMENTS

| | | |
|---|---|---|
| KR | 10-2005-0094501 A | 9/2005 |
| KR | 10-0520741 B1 | 10/2005 |
| KR | 10-0981283 B1 | 9/2010 |
| WO | 03001575 A2 | 1/2003 |

OTHER PUBLICATIONS

Philip Landon., et al., "Direct formation of hydrogen peroxide from H2/O2 using a gold catalyst," Chem. COmmun.,, 2058-2059 (2002).
Benjamin E. Solsona, et al., "Direct Synthesis of Hydrogen Peroxide from H2 and O2 Using Al2O3 Supported Au—Pd Catalysts," Chem. Mater., vol. 18, pp. 2689-2695 (2006).
Jennifer K. Edwards, et al., "Switching Off Hydrogen Peroxide Hydrogenation in the Direct Synthesis Process," Science, vol. 323, pp. 1037 (2009).
Sivadinarayana Chinta, et al., "A mechnistic study of H2O2 and H2O formation from H2 and O2 catalyzed by palladium in an aqueous medium," Journal of Catalysis, vol. 225, pp. 249-255 (2004).
Qingsheng Liu, et al., "The roles of chloride ions in the direct formation of H2O2 from H2 and O2 over a Pd/SiO2 catalyst in a H2SO4/ethanol system," Journal of Catalysis, vol. 239, pp. 237-243 (2006).
Gary Jacobs, et al., "Characterization of the morphology of Pt clusters incorporated in a KL zeolite by vapor phase and incipient wetness impregnation. Influences of Pt particle morphology on aromatization activity and deactivation," Applied Catalysis A: General, vol. 188, pp. 79-98 (1999).
Yoshinori Yamanoi, et al., "Immobilization of Gold Nanoparticles onto Silicon Surfaces by Si—C Covalent Bonds," Langmuir, vol. 20, pp. 1054-1056 (2004).
Srividhya Kidambi, et al., "Selective Hydrogenation by Pd Nanoparticles Embedded in Polyelectrolyte Multilayers," J. Am. Chem. Soc., vol. 126, pp. 2658-2659 (2004).
Yi-Fan Han, et al., "Direct Formation of H2O2 from H2 and O2 over a Pd/SiO2 catalyst: the roles of the acid and the liquid phase," Journal of Catalysis, vol. 230, pp. 313-316 (2005).
International Search Report of PCT/KR2011/002055 dated Nov. 30, 2011 (5 pages).
Kidambi et al.; "Multilayered Polyelectrolyte Films Containing Palladium Nanoparticles: Synthesis, Characterization, and Application in Selective Hydrogenation"; Chemistry of Materials, vol. 17, No. 2; 2005; pp. 301-307.
European Search Report dated Oct. 4, 2013 for Application No. PCT/KR2011002055.
Kidambi et al.; Selective Hydrogenation by Pd Nanoparticles Embedded in Polyelectrolyte Multilayers; J. Am. Chem. Soc., 2004, vol. 126.
Kidambi et al.; Multilayered Polyelectrolyte Films Containing Palladium Nanoparticles: Synthesis, Characterization, and Application in Selective Hyrogenation, Chem. Mater; 2005.
Office Action dated Jul. 8, 2014 issued by the Japanese Patent Office. (Translation enclosed).

FIG. 1

Stationary Phase
(Negative charge)

polyelectrolyte

Immobilization
(Pd nanoparticles)

* : Pd nanoparticle
～ : Positive charged PEL
～ : Negative charged PEL

CATALYST HAVING SURFACE-MODIFIED METAL NANOPARTICLES IMMOBILIZED IN STATIONARY PHASE IN WHICH A POLYMER ELECTROLYTE MEMBRANE IS FORMED, AND PREPARATION METHOD THEREOF

RELATED APPLICATIONS

This application is a United States national phase application under 35 USC §371 of PCT/KR2011/002055 filed on Mar. 25, 2011, and claims the benefit under 35 USC §119 of Korean patent application number KR 10-2010-0027651 filed Mar. 29, 2010, the disclosures of which are all incorporated herein by reference in their entireties.

TECHNICAL FIELD

The present invention relates to a catalyst having surface-modified metal nanoparticles to immobilized on a stationary phase on which a polymer electrolyte membrane is formed, and a method of preparing the same. More particularly the present invention relates to a catalyst having surface-modified metal nanoparticles immobilized on a stationary phase on which an ionic polymer electrolyte membrane is formed.

BACKGROUND ART

Currently, 90% or more of hydrogen peroxide production is dependent on an anthraquinone process. This process has a large number of reaction steps, including hydrogenation, oxidation, extraction, purification, etc., and thereby impurities are formed due to side-reactions through individual steps, thus requiring removal and separation thereof. Also, the produced hydrogen peroxide has a low concentration and is thus required to be distilled so as to be further concentrated [J. M. Campos-Martin, G. Blanco-Brieva, J. L. G. Fierro, Angew. Chem. Int. Ed., vol. 45, pp. 6962 (2006)].

In order to solve such problems, research into directly preparing hydrogen peroxide from oxygen and hydrogen is ongoing, but the use of the mixture comprising oxygen and hydrogen causes an explosion hazard. In addition, the produced hydrogen peroxide may easily decompose into water and oxygen because of instability thereof, and also the catalyst used is useful in synthesis of water, making it difficult to obtain high selectivity in the course of synthesis of hydrogen peroxide. Therefore, to solve these problems, research into strong acid and halide additives has been conducted. However, the strong acid and halide additives may cause problems of corrosion of the reactor and may dissolve the metal immobilized on a stationary phase, undesirably decreasing activity of the catalyst. Moreover, the hydrogen peroxide preparation process needs separation and purification.

The catalyst used in the direct preparation of hydrogen peroxide mainly includes a precious metal such as gold, platinum, palladium or the like [P. Landon, P. J. Collier, A. J. to Papworth, C. J. Kiely, G. J. Hutchings, Chem. Commun., pp. 2058, (2002); B. E. Solsona, J. K Edwards, P. Landon, A. F. Carley, A. Herzing, C. J. Kiely, G. J. Hutchings, Chem. Mater., vol. 18, pp. 2689 (2006), J. K Edwards, B. Solsona, E. Ntainjua N, A. F. Carley, A. A. Herzing, C. J. Kiely, G. J. Hutchings, Science, vol. 323, pp. 1037 (2009); S. Chinta, J. H. Lunsford, J. Catal., vol. 225, pp. 249 (2004); Y. Han, J. H. Lunsford, J. Catal., vol. 230, pp. 313, (2005); Q. Liu, J. H. Lunsford, J. Catal. vol. 239, pp. 237 (2006)].

Because the catalyst is prepared using an expensive precious metal, there is a need for studies for preparation which enables repeated use of the catalyst. To this end, research into immobilizing precious metal particles on a stationary phase to prevent dissolution upon reaction has been conducted. In addition to the preparation of hydrogen peroxide, methods of preparing catalysts using precious metals, in particular, immobilization methods are being investigated.

Examples of the immobilization methods include physical adsorption, encapsulation, covalent bonding and electrostatic bonding methods, depending on the interactions between the stationary phase and the catalyst.

The physical adsorption method is comparatively easy and uses Van der Waals interaction. Although this process is easy to do, bonding force between the catalyst and the stationary phase is weak and thus dissolution may easily occur [G. Jacobs, F. Ghadiali, A. Pisanu, A. Borgna, W. E. Alvarez, D. E. Resasco, Applied Catalysis A, vol. 188, pp. 79 (1999)].

The encapsulation method encapsulates the active catalyst in a polymer capsule, so that the reactant and the product are separated from each other to induce material transfer resistance, thereby enabling re-use of the catalyst and ensuring high catalyst stability.

The covalent bonding method uses strong covalent bonding between the stationary phase and the functional group on the surface of the catalyst to achieve immobilization, thus ensuring high stability without dissolution of the catalyst, but requires multiple steps. Also, a bond may be formed at the active site of the catalyst, and the catalyst structure may be deformed to due to strong bonding [Y. Yamanoi, T. Yonezawa, N. Shirahata, H. Nishihara, Langmuir, vol. 20, pp. 1054 (2004)].

The electrostatic bonding method uses ionic bonding between a catalyst and a support, and is thus very simple and suitable for a mass production process. Furthermore, sufficient electrostatic bond strength may minimize the dissolution of the catalyst, and may maximally keep up the intrinsic structure of the catalyst thus retaining catalytic activity [S. Kidambi, J. Dai, J. Li, M. L. Bruening, J. Am. Chem. Soc. vol. 126, pp. 2658 (2004)].

As mentioned above, in techniques for directly synthesizing hydrogen peroxide from oxygen and hydrogen, the development of a catalyst which may exhibit high efficiency under reaction conditions that are able to minimize addition of strong acid and halide while immobilizing a precious metal catalyst on a stationary phase to prevent dissolution is required.

DISCLOSURE

Technical Problem

Accordingly, an aspect of the present invention is to provide a catalyst having surface-modified metal nanoparticles immobilized on a stationary phase on which a polymer electrolyte membrane is formed.

Another aspect of the present invention is to provide a method of preparing the catalyst.

A further aspect of the present invention is to provide a method of preparing hydrogen peroxide from hydrogen and oxygen in the presence of the above catalyst.

However, the technical problem which is intended to be solved by the present invention is not limited to the above aspects, and other technical problems will be able to be apparently understood by those skilled in the art from the following description.

Technical Solution

According to an aspect of the present invention, a catalyst having surface-modified metal nanoparticles immobilized on a stationary phase on which a polymer electrolyte membrane is formed is provided.

According to another aspect of the present invention, a method of preparing a catalyst having surface-modified metal nanoparticles immobilized on a stationary phase on which a polymer electrolyte membrane is formed is provided, including (a) alternately mixing a stationary phase with a first polymer electrolyte solution and a second polymer electrolyte solution, thus forming a polymer membrane on the stationary phase, in which the first polymer electrolyte solution and the second polymer electrolyte solution are cationic or anionic electrolyte solutions having different polarities; (b) forming uniform metal nanoparticles and then surface-modifying the metal nanoparticles so that the metal nanoparticles are cationic or anionic; and (c) adding the stationary phase having the polymer electrolyte membrane formed in (a) to a solution of the surface-modified metal nanoparticles obtained in (b), thus obtaining the catalyst having the surface-modified metal nanoparticles immobilized on the stationary phase on which the polymer electrolyte membrane is formed.

According to a further aspect of the present invention, a method of preparing hydrogen peroxide from hydrogen and oxygen in the presence of the above catalyst is provided.

Advantageous Effects

According to the present invention, a catalyst having surface-modified metal nanoparticles immobilized on a stationary phase on which a polymer electrolyte membrane is formed has a structure which is very physically and chemically stable, thus increasing catalytic effects, and reusability of this catalyst can be increased because of no dissolution of the metal nanoparticles. Even when only a very small amount of halogen ion is added without the addition of an acid, hydrogen peroxide can be synthesized at a high yield via direct reaction of oxygen and hydrogen.

BEST MODE

Hereinafter, a detailed description will be given of the present invention.

An embodiment of the present invention is directed to a catalyst having surface-modified metal nanoparticles immobilized on a stationary phase on which a polymer electrolyte membrane is formed.

As used in the detailed description of the specification and the claims, the term "polymer electrolyte membrane" means a polymer electrolyte layer as a membrane formed via a layer-by-layer (LBL) deposition technique using a polymer electrolyte material, and the membrane includes not only a monolayer but also a multilayer unless otherwise mentioned.

The metal particles include palladium, platinum, ruthenium, rhodium, iridium, silver, osmium, nickel, copper, cobalt, titanium or mixtures thereof, and the surface-modified metal nanoparticles are negatively or positively charged.

In the catalyst having the surface-modified metal nanoparticles immobilized on a stationary phase on which a polymer electrolyte membrane is formed, bonding between the stationary phase and the multilayer polymer electrolyte membrane and bonding between individual layers of the multilayer polymer electrolyte membrane are formed via electrostatic interaction, hydrogen bonding, Van der Waals interaction or covalent bonding, thus forming a structure that is very physically and chemically stable.

Thus, the catalyst of the invention may fundamentally suppress the dissolution of metal particles during reaction, which is regarded as the major problem of conventionally prepared metal-supported catalysts, and thereby may prevent the activity of the catalyst from decreasing thus achieving a catalyst system having very high profitability.

The stationary phase may have a predetermined charge so that the cationic or anionic polymer electrolyte may be easily adsorbed thereon. The stationary phase may include acidic, neutral, or basic inorganic materials, and particularly useful is an anionic or cationic resin.

The stationary phase has a predetermined charge so that the cationic or anionic polymer electrolyte may be easily adsorbed thereon. According to a specific embodiment of the invention, the cationic resin used as the stationary phase may include a polymer resin having, at a side chain thereof, a cationic functional group selected from the group consisting of a sulfonic acid group, a carboxylic acid group, a phosphoric acid group, and a phosphonic acid group. An example of the ionic resin having such a cationic functional group may include one or more selected from among fluorine-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers and polyphenylquinoxaline-based polymers. Particularly useful are one or more selected from among poly(perfluorosulfonic acid), poly(perfluorocarboxylic acid), copolymers of fluorovinylether and tetrafluoroethylene having a sulfonic acid group, defluorinated polyetherketone sulfide, aryl ketone, poly[2,2'-(m-phenylene)-5,5'-bibenzimidazole] and poly(2, 5-benzimidazole).

The anionic resin used as the stationary phase includes a halogen compound and/or a bicarbonate type anionic resin and a carbonate and a hydroxide type resin or mixtures thereof.

For example, the case where an anionic exchange resin having a sulfonic acid group ($SO_3^-$) is used as the stationary phase in the present invention enables strong bonding with the polymer electrolyte membrane. The metal nanoparticles immobilized on such a polymer electrolyte membrane may be very strongly bound to a ligand which stabilizes the polymer electrolyte membrane and the metal nanoparticles via electrostatic interaction, hydrogen bonding, Van der Waals interaction or covalent bonding.

The polymer electrolyte membrane is composed of cationic and anionic polymer electrolytes, and a variety of kinds of cationic or anionic polymer electrolytes may be used, thus adjusting ionic bond strength of the polymer electrolyte.

The cationic polymer electrolyte may include but is particularly not limited to PAH (Poly(allylamine hydrochloride)), PDDA (Polydiallyldimethylammonium), PEI (Poly(ethyleneimine)), or PAMPDDA (Poly(acrylamide-co-diallyldimethylammonium).

The anionic polymer electrolyte may include PSS (Poly(4-styrenesulfonate), PAA (Poly(acrylic acid)), PAM (Poly(acryl amide)), poly(vinylphosphonic acid), PAAMP (Poly(2-acrylamido-2-methyl-1-propanesulfonic acid), PATS (Poly(anetholesulfonic acid)), or PVS (Poly(vinyl sulfate)).

Because the hydrogen ion concentration varies depending on the number of layers of the anionic polymer electrolyte solution, the acid strength and the acid amount may be controlled by adjusting the number of layers. Particularly in the case of a halogen anion, it may form ionic bonding with the cationic polymer, and thus the number of layers is adjusted thus controlling the amount of halogen.

The amount of the immobilized metal nanoparticles may vary depending on the number of layers of the polymer electrolyte membrane, and the number of layers of the polymer electrolyte membrane may be 1~9 but the present invention is not particularly limited thereto. The polymer electrolyte may have a weight average molecular weight of 1,000~1,000,000.

Another embodiment of the present invention is directed to a method of preparing the catalyst having surface-modified metal nanoparticles immobilized on a stationary phase on which a polymer electrolyte membrane is formed, including (a) alternately mixing a stationary phase with a first polymer electrolyte solution and a second polymer electrolyte solution thus forming a polymer membrane on the stationary phase, in which the first polymer electrolyte solution and the second polymer electrolyte solution are cationic or anionic electrolyte solutions having different polarities; (b) forming uniform metal nanoparticles and then modifying the surface of the formed metal nanoparticles so as to be cationic or anionic; and (c) adding the stationary phase having the polymer electrolyte membrane formed in (a) to the solution of the surface-modified metal nanoparticles obtained in (b), thus preparing a catalyst having the surface-modified metal nanoparticles immobilized on the stationary phase on which the polymer electrolyte membrane is formed.

In (a), the cationic polymer electrolyte and the anionic polymer electrolyte solution having different polarities are mixed so that the polymer electrolyte solutions are alternately formed on the stationary phase. The cationic and anionic polymer electrolytes used may be the same as the polymer electrolyte which constitutes the catalyst of the invention as mentioned above.

In (b), the metal nanoparticles are uniformly formed, and then the surface thereof is modified so that the metal nanoparticles are cationic or anionic. When the cationic or anionic surface-modified metal nanoparticles are formed in this way, they may be easily immobilized on the polymer electrolyte membrane.

Figure 1:
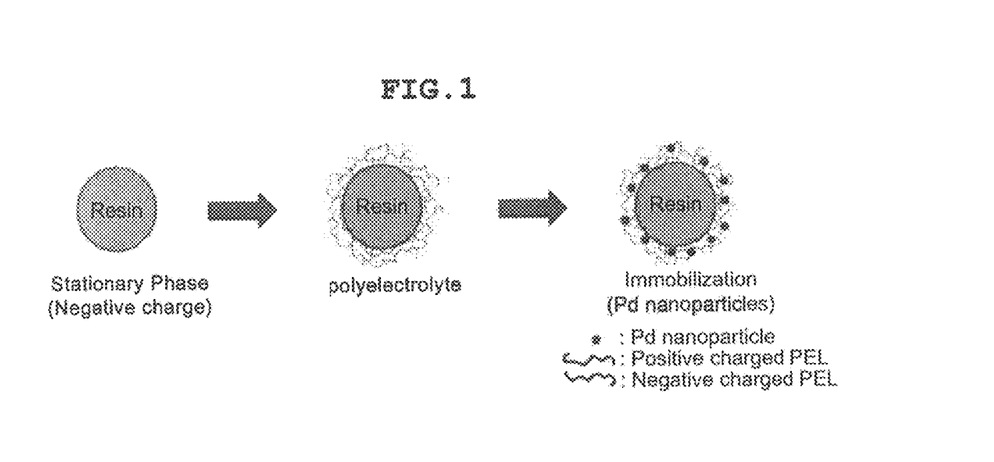
FIG. 1 illustrates a process of preparing a catalyst having surface-modified metal nanoparticles immobilized on a stationary phase on which a polymer electrolyte membrane is formed.
Figure 4:
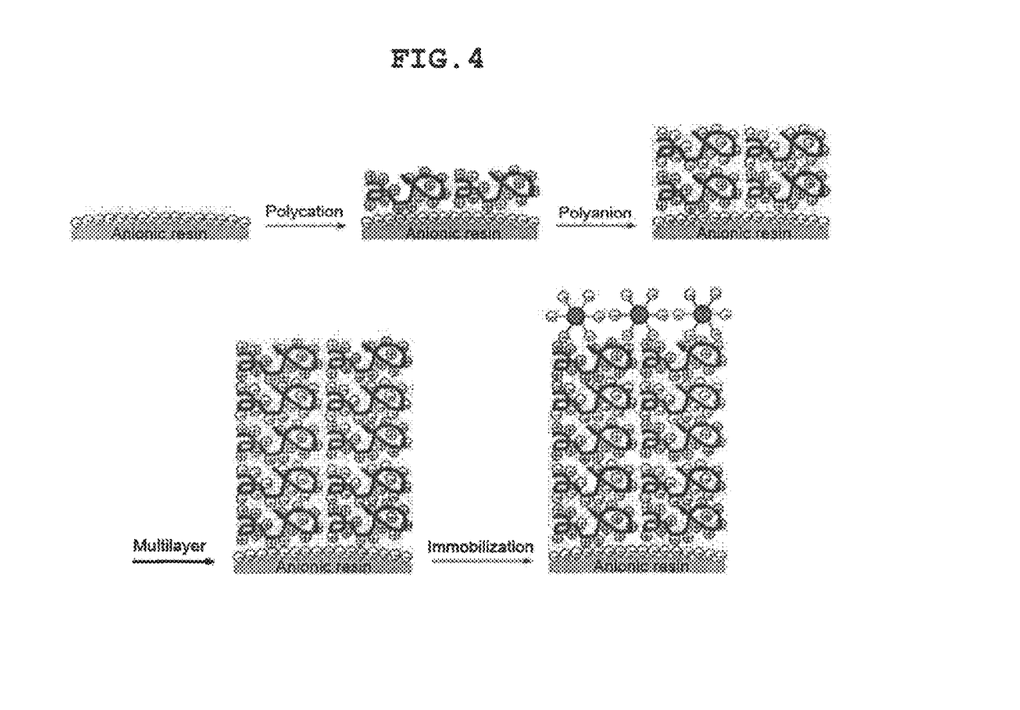
FIG. 4 illustrates a process of repeating sequential formation of a cationic polymer electrolyte and an anionic polymer electrolyte on an anionic exchange resin stationary phase so that the cationic polymer electrolyte is formed on the outer surface, thus forming a multilayer polymer membrane, and then immobilizing negatively charged surface-modified metal nanoparticles thereon.

FIG. 1 schematically shows the process of preparing the catalyst having the surface-modified metal nanoparticles immobilized on the stationary phase on which the polymer electrolyte membrane is formed, and FIG. 4 illustratively shows the preparation of the above catalyst in detail.

The formation of the uniform nanoparticles in (b) is performed by subjecting a metal precursor to pyrolysis to form and grow a nucleus, and binding a ligand around the nucleus to enclose the nanoparticles so that these particles are stabilized.

Figure 2:
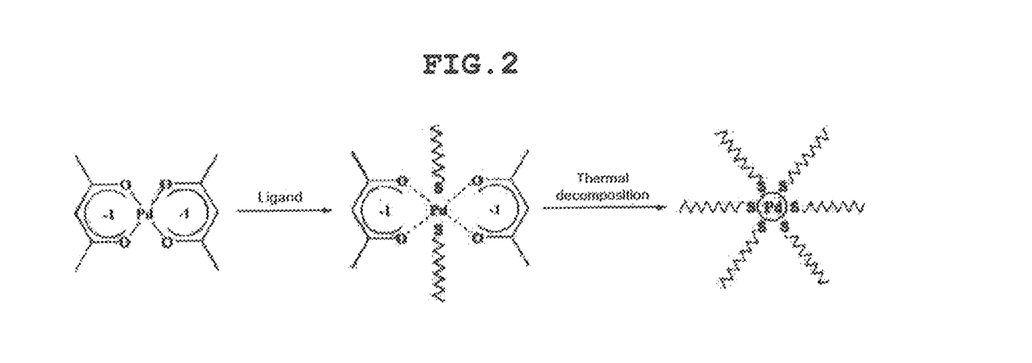
FIG. 2 illustrates a process of preparing uniform metal nanoparticles via reaction between a metal precursor and a ligand.

For example, as shown in FIG. 2, when the metal precursor including the metal ion and the ligand having a thiol functional group bound thereto is pyrolyzed, the metal ion is formed into nanoparticles via reduction, and the ligand stabilizes the procedure of forming the nanoparticles and suppresses the aggregation of the formed nanoparticles.

The pyrolysis and reaction time and temperature and the ratio of the metal precursor and the ligand are adjusted, making it possible to control the size of the nanoparticles and to form uniform nanoparticles. The ratio of the metal precursor and the ligand may be appropriately adjusted but is not particularly limited.

The ligand may include dodecyl sulfide, TOP (Trioctyl phosphine), PVP (Poly(vinylpyrrolidone)), poly(4-vinylpyridine), etc. Such a ligand forms a strong bond with a metal to thereby form nanoparticles and increase stability. Because the ligand is hydrophobic, it is dispersed in a hydrophobic organic solvent such as toluene and maintained in a solution state.

Figure 3:
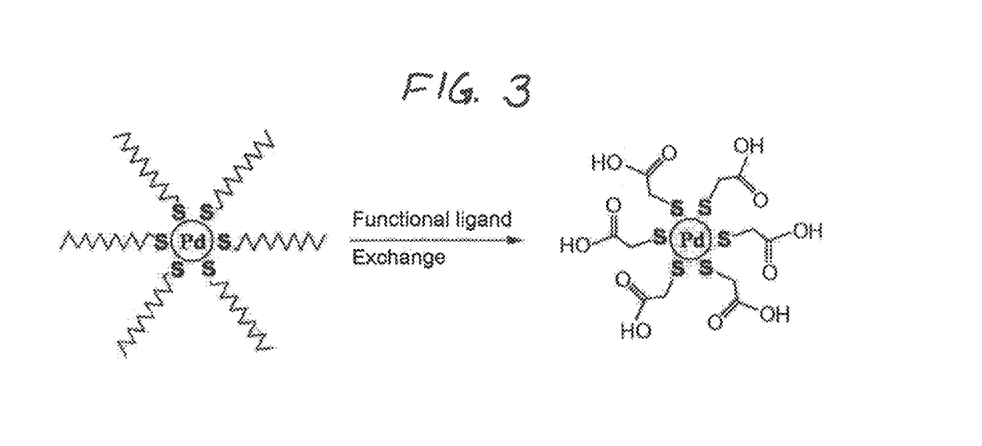
FIG. 3 illustrates a process of substituting the ligand of the metal nanoparticles so that the surface of the metal nanoparticles is modified to be negatively charged.

Because the surface of the formed metal nanoparticles is hydrophobic, the terminal of the ligand is substituted with a functional group which easily dissociates into negative or positive charges while stabilizing the metal nanoparticles, as shown in FIG. 3, in order to immobilize them on a stationary phase such as a support. The ligand for surface modification may include a negatively charged material or a positively charged material. Particularly, the terminal of the ligand is substituted with a carboxylic functional group using MAA (Mercaptoacetic acid), MPA (Mercaptopropionic acid) or PEI (polyethyleneimine), thus forming a negatively charged surface.

Upon surface-modifying the metal nanoparticles, the ratio of the metal nanoparticle solution and the ligand to be substituted is not particularly limited and may be adjusted.

The substitution of the ligand is carried out via spontaneous bonding of a ligand around the nanoparticles and place-exchange reaction. Also, because the surface-modified nanoparticles are obtained via simple ligand substitution, the size and properties of the formed nanoparticles may be maintained, thereby retaining the intrinsic properties of the nanoparticles to thus have no influence on the effect of the catalyst.

The surface-modified metal nanoparticles have a positively or negatively charged functional group at the terminal thereof, and are thus dispersed in an aqueous solution.

In the case where a catalyst is conventionally prepared by directly binding the particles using a typical process, it is difficult to adjust the size of the metal particles and to maintain the properties of the uniform catalyst. However, the present invention adopts a method of immobilizing the uniform metal nanoparticles on the stationary phase via surface modification of the uniform metal nanoparticles and the formation of the polymer electrolyte membrane on the stationary phase, whereby the metal nanoparticles exist in the form of hanging on the polymer electrolyte membrane, making it possible to maintain the properties of the uniform catalyst and eliminating the dissolution of the metal nanoparticles.

Also according to the method of the invention, upon layering the polymer membrane, the combination of cationic polymer membrane/surface-modified metal nanoparticles, or the combination of anionic polymer membrane/surface-modified metal nanoparticles is applied, so that the metal nanoparticles having an anionic surface or the metal nanoparticles having a cationic surface may be provided in the form of a single membrane, making it possible to prepare a catalyst. Because the ionic density of the surface varies depending on the number of layers, the amount of the immobilized metal nanoparticles may be adjusted.

In the method of the invention, because the hydrogen ion concentration varies depending on the number of layers of the acidic polymer electrolyte, the acid strength and the acid amount may be controlled by adjusting the number of layers, or the amount of halogen may be controlled by adjusting the number of layers of the polymer electrolyte which forms a salt with the halogen anion.

A further embodiment of the invention is directed to a method of preparing hydrogen peroxide via direct reaction of oxygen and hydrogen using the catalyst having surface-modified metal nanoparticles immobilized on a stationary phase on which a polymer electrolyte membrane is formed.

The synthesis of hydrogen peroxide may be carried out via liquid reaction using methanol, ethanol or water as a solvent (a reaction medium).

For the reaction, the oxygen and hydrogen reactants are provided in the form of a gas mixture diluted with nitrogen to decrease an explosion hazard, and the volume ratio of hydrogen to oxygen to nitrogen is 3:40:57, and the ratio of the total amount of gas used in the reaction and the rate of the solvent is set to about 3200, and a tubular reactor equipped with a cooling water jacket is used, and a reaction pressure of 50 bar and a reaction temperature of 25~40° C. are applied.

In the reaction for preparing hydrogen peroxide from oxygen and hydrogen, only a very small amount of halogen additive is used without the addition of a strong acid to prevent corrosion of the reactor. The halogen additive may include hydrobromic acid, sodium bromide (NaBr), potassium bromide (KBr), etc. The concentration of the halogen additive is 100 ppm or less, particularly 15 ppm, based on the mass of methanol used as the solvent.

A better understanding of the present invention may be obtained through the following preparation example of a catalyst and examples and comparative examples of using the above catalyst to directly prepare hydrogen peroxide from oxygen and hydrogen reactants.

EXAMPLE 1

Synthesis of Uniform Metal Nanoparticles

A metal precursor and a ligand were reacted to form uniform palladium nanoparticles as described below.

Figure 5:
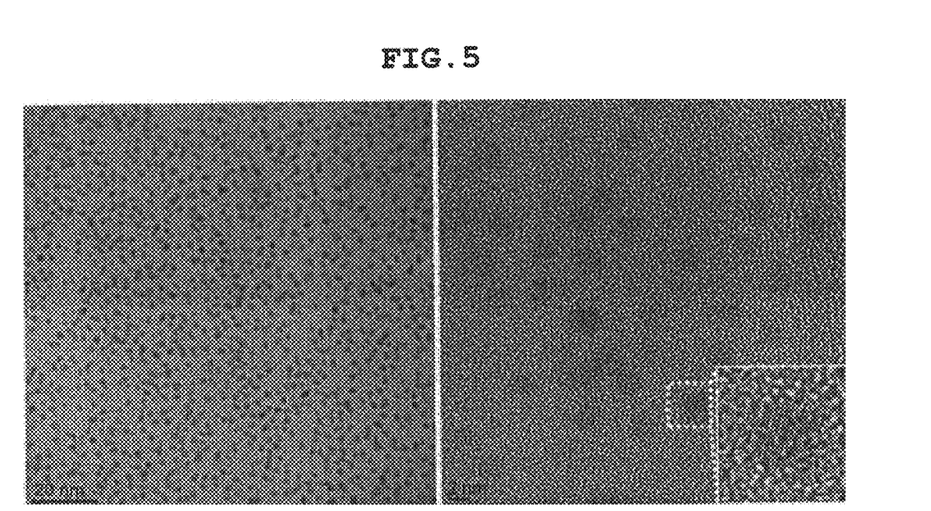
FIG. 5 illustrates the uniformly prepared metal nanoparticles analyzed using a transmission electron microscope (2.1±0.2 nm)

Specifically, 45 ml of a toluene solvent was placed in a flask, and the temperature was increased to 95° C. in an argon gas environment. 0.20 g of palladium acetate as a metal precursor and 1.65 g of dodecyl sulfide as a ligand were dissolved in 5 ml of toluene and this solution was then placed in the flask, after which the reaction was carried out for 1 hr. Thereafter, the temperature of the solution was decreased to room temperature and the solvent was removed therefrom using a rotary concentrator. The reaction product was dispersed in 30 ml of acetone, divided into Eppendorf tubes, washed three times with acetone, and finally dispersed in 30 ml of toluene, thus obtaining formed metal nanoparticles. FIG. 5 shows the uniformly prepared metal nanoparticles analyzed using a transmission electron microscope (2.1±0.2 nm).

EXAMPLE 2

Surface Modification of Metal Nanoparticles

The hydrophobic ligand of the above-prepared uniform metal nanoparticles was substituted with a ligand having a functional group at the terminal thereof to modify the surface of the nanoparticles.

10 ml of the metal nanoparticle solution of Example 1 and 10 ml of MAA (Mercaptoacetic acid) as a ligand to be substituted were placed in a vial. The reaction was carried out at 60° C. for 12 hr with vigorous stirring. After the reaction, 2 ml of toluene and 3 ml of distilled water were placed in the vial so that the phases were separated, and the toluene supernatant was removed.

Figure 6:
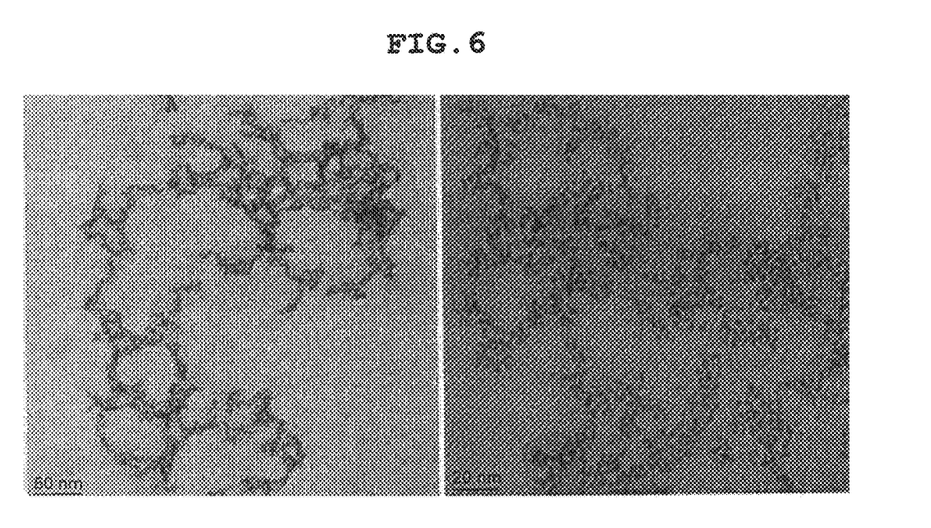
FIG. 6 illustrates the surface-modified metal nanoparticles analyzed using a transmission electron microscope (2.4±0.1 nm)
Figure 7:
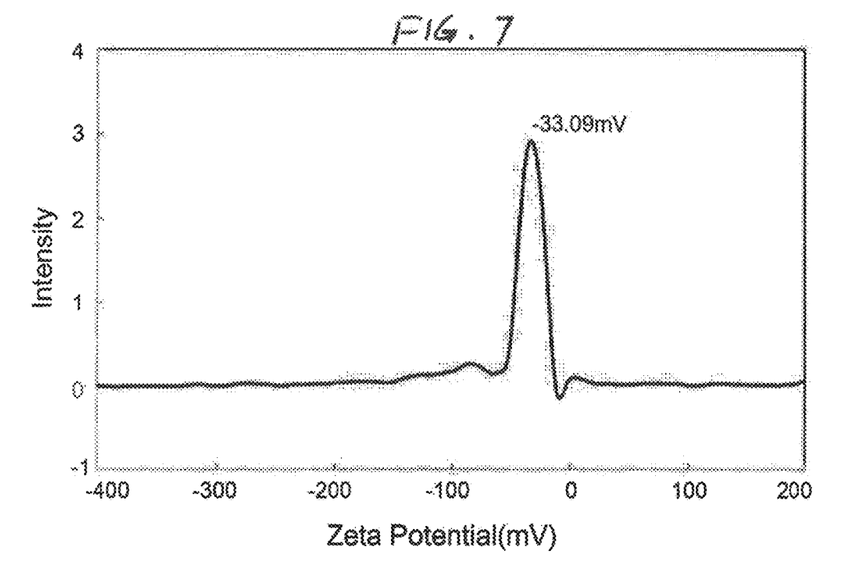
FIG. 7 illustrates the surface-modified metal nanoparticles analyzed using a zeta potential meter (−33.09 mV)

The remaining surface-modified metal nanoparticle solution was divided into Eppendorf tubes and washed three times with distilled water. Subsequently, MAA which was left behind in the surface-modified metal nanoparticle solution obtained after washing was removed using a filter, followed by dispersion in distilled water, yielding surface-modified metal nanoparticles. FIG. 6 shows the surface-modified metal nanoparticles analyzed using a transmission electron microscope (2.4±0.1 nm), and FIG. 7 shows the surface-modified metal nanoparticles analyzed using a zeta potential meter (−33.09 mV).

EXAMPLE 3

Formation of Polymer Electrolyte Membrane on Stationary Phase

A polymer electrolyte membrane was formed on an anionic exchange resin having a sulfonic acid group ($SO_3^-$) as follows. The entire procedure was carried out at room temperature.

Specifically, a 20 mM PAH (Poly(allylamine hydrochloride)), weight average molecular weight 200,000) aqueous solution and a 60 mM PSS (Poly(4-styrene sulfonic acid), weight average molecular weight 70,000) aqueous solution were prepared, and the pH thereof was adjusted to 9 using hydrochloric acid and sodium hydroxide.

10 g of the anionic exchange resin having a sulfonic acid group ($SO_3^-$) was added to 100 ml of distilled water and washing for 1 hr was repeated three times. The distilled water was removed, and 100 ml of a 20 mM PAH aqueous solution was placed in the flask containing the anionic exchange resin having a sulfonic acid group ($SO_3^-$), and stirred for 20 min. The solution remaining in the beaker was removed, and 100 ml of distilled water was further added and washing for 5 min was repeated three times. The number of layers of the polymer electrolyte membrane formed on the stationary phase was 1.

A material including the anionic exchange resin having a sulfonic acid group ($SO_3^-$) and the PAH layer formed thereon was mixed with 100 ml of a 60 mM PSS aqueous solution and stirred for 20 min. The solution remaining behind in the beaker was removed, and 100 ml of distilled water was further added and washing for 5 min was repeated three times.

EXAMPLE 4

Formation of Multilayer Polymer Electrolyte Membrane on Stationary Phase

This example was conducted in the same manner as in Example 3, with the exception that the same procedure as in Example 3 was repeated so that the number of layers of the polymer electrolyte membrane was 9.

EXAMPLE 5

Immobilization of Surface-Modified Metal Nanoparticles on Stationary Phase Having Polymer Electrolyte Membrane Formed Thereon Immobilizing the surface-modified metal nanoparticles on the anionic exchange resin having the polymer electrolyte membrane formed thereon was performed via the following to procedure. The entire procedure was carried out at room temperature.

Into a flask containing the stationary phase having the anionic exchange resin having a sulfonic acid group ($SO_3^-$) on which the polymer electrolyte membrane was formed, 600 mg of surface-modified metal nanoparticles was added and stirred for 24 hr to react. The solution remaining in the beaker was removed, after which 100 ml of distilled water was further added and washing for 5 min was repeated three times.

EXAMPLE 6

Figure 8:
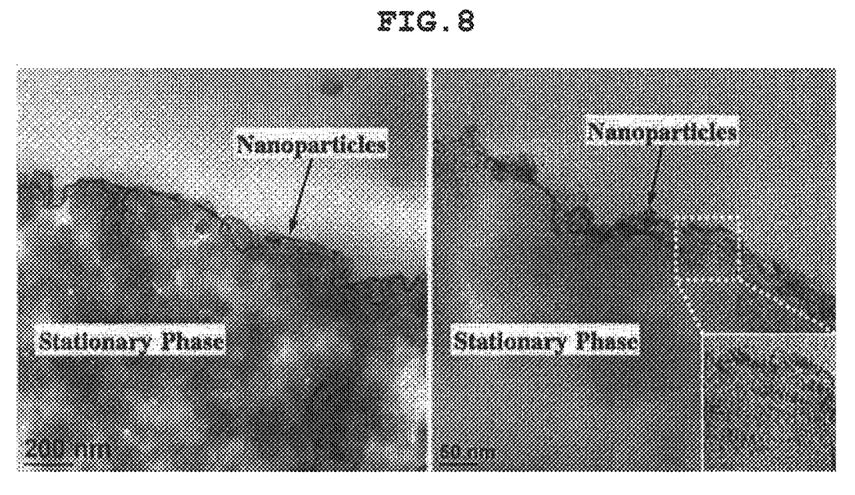
FIG. 8 illustrates the catalyst having surface-modified metal nanoparticles immobilized on a stationary phase on which a polymer electrolyte membrane is formed, which is manufactured in the form of a specimen using a cryo-microtome and then analyzed using a cryo-electron microscope.

Immobilization of Surface-Modified Metal Nanoparticles on Stationary Phase Having Multilayer Polymer Electrolyte Membrane Formed Thereon An immobilization process was conducted in the same manner as in Example 5, with the exception that the stationary phase having a 9-layer polymer electrolyte membrane instead of the monolayer polymer electrolyte membrane of Example 5 was used. FIG. 8 illustrates the surface-modified metal nanoparticles immobilized on the stationary phase on which the polymer electrolyte membrane was formed, which were manufactured in the form of a specimen using a cryo-microtome and then analyzed using a cryo-electron microscope.

TEST EXAMPLE 1

Efficiency of Catalyst Having Monolayer Polymer Electrolyte Membrane

Hydrogen peroxide was prepared from oxygen and hydrogen using the catalyst prepared in Example 5, and the efficiency of the catalyst was evaluated.

Into a tubular reactor equipped with a cooling water jacket, 10 cc of the catalyst was placed, and methanol was added for 3 hr under conditions of 1 bar and 30° C. and washing was conducted. Then, the solvent was replaced with methanol containing 15 ppm HBr, instead of methanol, and the reaction pressure was increased to 50 bar, and the volume ratio of hydrogen to oxygen to nitrogen was 3:40:57, and the ratio of the total amount of gas used in the reaction to the rate of the solvent was set to about 3200. In this state, the reaction was carried out. Thereafter, the yield of hydrogen peroxide was calculated via titration. The results are shown in Table 1 below.

TEST EXAMPLE 2

Efficiency of Catalyst Having 9-Layer Polymer Electrolyte Membrane

Hydrogen peroxide was prepared from oxygen and hydrogen using the catalyst prepared in Example 6, and the efficiency of the catalyst was evaluated.

TABLE 1

| Test Ex. | Cationic Polymer Electrolyte | | | Anionic Polymer Electrolyte | | | Number of Layers of Membrane | Pd (wt %) | $H_2O_2$ Yield (wt %) | Productivity (g $H_2O_2$/g Pd · hr) |
|---|---|---|---|---|---|---|---|---|---|---|
| | Kind | Conc. | pH | Kind | Conc. | pH | | | | |
| 1 | PAH | 20 mM | 9 | PSS | 60 mM | 9 | 1 | 0.154 | 8.03 | 105 |
| 2 | PAH | 20 mM | 9 | PSS | 60 mM | 9 | 9 | 0.009 | 1.11 | 249 |

The invention claimed is:

1. A method of preparing hydrogen peroxide from hydrogen and oxygen using a catalyst comprising:
   (i) introducing a catalyst into a reactor wherein the catalyst has been prepared by the following steps comprising;
      (a) alternately mixing a stationary phase with a first polymer electrolyte solution and a second polymer electrolyte solution, thus forming a polymer membrane on the stationary phase, in which the first polymer electrolyte solution and the second polymer electrolyte solution are cationic or anionic electrolyte solutions having different polarities, and the stationary phase is an ionic exchange resin;
      (b) surface-modifying metal nanoparticle by the following steps comprising:

providing a metal precursor having a metal ion and a first ligand having hydrophobic property, thermally decompositing the metal precursor to form uniform hydrophobic metal nanoparticles, and substituting a terminal of the first ligand of the metal nanoparticles with a second ligand having a functional group which dissociates into negative or positive charge to obtain cationic or anionic metal nanoparticles, wherein the metal ion is palladium, platinum, ruthenium, rhodium, iridium, silver, osmium, nickel, copper, cobalt, titanium or mixtures thereof, wherein the first ligand is dodecyl sulfide, TOP (Trioctyl phosphine), PVP (Poly(vinylpyrrolidone)), or poly(4-vinylpyridine), and the second ligand includes negatively charged material or positively charged material; and (c) adding the stationary phase haying the polymer electrolyte membrane formed in (a) to a solution of the surface-modified metal nanoparticles obtained in (b), thus obtaining the catalyst having the surface modified metal nanoparticles immobilized on the stationary phase on which the polymer electrolyte membrane is formed;

(ii) supplying hydrogen, oxygen and nitrogen into the reactor to which the catalyst has been introduced; and (iii) recovering hydrogen peroxide.

2. The method of preparing hydrogen peroxide of claim 1, wherein the polymer electrolyte membrane comprises cationic and anionic polymer electrolytes.

3. The method of preparing hydrogen peroxide of claim 1, wherein the surface-modified metal nanoparticles are negatively or positively charged.

4. The method of preparing hydrogen peroxide of claim 2, wherein the cationic polymer electrolyte is PAH (Poly (allylamine hydrochloride)), PDDA (Polydiallyldimethylammonium)), PEI(Poly(ethyleneimine)), or PAMPDDA (Poly-(acrylamide-co-diallyldimethylammonium).

5. The method of preparing hydrogen peroxide of claim 2, wherein the anionic polymer electrolyte is PSS (Poly(4-styrenesulfonate), PAA (Poly(acrylic acid)), PAM (Poly (acryl amide)), poly(vinylphosphonic acid), PAAMP (Poly (2-acrylamido-2-methyl-1-propanesulfonic acid), PATS (Poly(anetholesulfonic acid)), or PVS(Poly(vinyl sulfate)).

6. The method of preparing hydrogen peroxide of claim 1, wherein a number of layers of the polymer electrolyte membrane is 1~9.

7. The method of preparing hydrogen peroxide of claim 1, wherein the polymer electrolyte has a weight average molecular weight of 1,000~1,000,000 g/mol.

* * * * *